US010528595B2

(12) United States Patent
Bilinski et al.

(10) Patent No.: US 10,528,595 B2
(45) Date of Patent: Jan. 7, 2020

(54) DATASET RECONCILIATION THROUGH PARTITIONING AND POLYNOMIAL INTERPOLATION

(71) Applicant: SPAWAR Systems Center Pacific, San Diego, CA (US)

(72) Inventors: Mark Bilinski, Vista, CA (US); Ryan Gabrys, San Diego, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 505 days.

(21) Appl. No.: 15/486,746

(22) Filed: Apr. 13, 2017

(65) Prior Publication Data

US 2018/0300384 A1 Oct. 18, 2018

(51) Int. Cl.
*G06F 16/00* (2019.01)
*G06F 16/27* (2019.01)
*H04L 29/08* (2006.01)

(52) U.S. Cl.
CPC ............ *G06F 16/278* (2019.01); *G06F 16/27* (2019.01); *G06F 16/273* (2019.01); *G06F 16/275* (2019.01); *H04L 67/1095* (2013.01)

(58) Field of Classification Search
CPC ...... G06F 16/27; G06F 16/273; G06F 16/275; G06F 16/278; H04L 67/1095
USPC ......................................................... 707/634
See application file for complete search history.

(56) References Cited

U.S. PATENT DOCUMENTS

| 6,108,647 | A  | * | 8/2000  | Poosala   | G06Q 30/0283 |
|-----------|----|---|---------|-----------|--------------|
| 6,295,541 | B1 | * | 9/2001  | Bodnar    | G06F 16/275  |
| 9,396,202 | B1 | * | 7/2016  | Drobychev | G06F 16/1744 |
| 10,089,176| B1 | * | 10/2018 | Donlan    | G06F 11/1076 |
| 2008/0189498 | A1 | * | 8/2008 | Brown   | G06F 11/1004 |
|           |    |   |         |           | 711/162      |

OTHER PUBLICATIONS

D. Chen, C. Konrad, K. Yi, W. Yu, Q. Zhang, "Robust set reconciliation," SIGMOD, 2014.
D. Eppstein, M. Goodrich, F. Uyeda, G. Varghese, "What's the difference? Efficient set reconciliation without prior context," SIGCOMM 2011.

(Continued)

*Primary Examiner* — Vincent F Boccio
(74) *Attorney, Agent, or Firm* — Naval Information Warfare Center, Pacific; Kyle Eppele; J. Eric Anderson

(57) ABSTRACT

A method for synchronizing datasets comprising the steps of: (1) partitioning each dataset into a plurality of bins according to a first partitioning rule, wherein each bin contains a random subset of elements of symmetric difference taken from a universe of all possible elements, (2) performing a first round of polynomial interpolation (PI) at a first encoding threshold on each bin of the first-partitioned datasets, wherein if any bin contains a number of elements that is less than or equal to the first encoding threshold the elements contained therein are decoded during the first PI round, and wherein if any bin contains a number of elements that is greater than the first encoding threshold the elements contained therein are not decoded during the first PI round; and (3) synchronizing the datasets based on the decoded elements.

20 Claims, 5 Drawing Sheets

(56) References Cited

OTHER PUBLICATIONS

R. Gabrys and F. Farnoud, "Reconciling similar sets of data," ISIT, 2015.
M. Karpovsky, L. Levitin, and A. Trachtenberg, "Data verification and reconciliation with generalized error-control codes," IEEE Trans. Info. Theory, Jul. 2003.
Y. Minsky, A. Trachtenberg, "Practical set reconciliation," Tech. Rep., Department of Electrical and Computer Engineering, Boston University, 2002.
Y. Minsky, A. Trachtenberg, R. Zippel, "Set reconciliation with nearly optimal communication complexity," IEEE Trans. Inform. Theory, vol. 49, No. 9, pp. 2213-2218, Sep. 2003.
I. R. Porche III, B. Wilson, E.E Johnson, S. Tierney, E. Saltzman, data flood, RAND Corporation, 2014.
V. Skachek and M.G. Rabbat, "Subspace synchronization: a network-coding approach to object reconciliation," ISIT, 2014.
P.B. Symon and A. Tarapore, "Defense intelligence analysis in the age of big data," Joint Force Quarterly, No. 79, pp. 4-11, 4th quarter, 2015.

\* cited by examiner

10

```
┌─────────────────────────────────────────────────────────┐
│ Partition each of the first and second datasets into a  │
│ plurality of bins according to a first partitioning     │
│ rule, wherein each bin contains a random subset of      │── 10a
│ elements of symmetric difference (hereafter referred to │
│ as elements) taken from a universe of all possible      │
│ elements that could be contained in the first and a     │
│ second datasets.                                         │
└─────────────────────────────────────────────────────────┘
                            │
                            ▼
┌─────────────────────────────────────────────────────────┐
│ Perform a first round of polynomial interpolation (PI)  │
│ at a first encoding threshold on each bin of the        │
│ first-partitioned datasets with the first and second    │
│ computers, wherein if any bin contains a number of      │
│ elements that is less than or equal to the first        │
│ encoding threshold the elements contained therein are   │── 10b
│ decoded during the first PI round, and wherein if any   │
│ bin contains a number of elements that is greater than  │
│ the first encoding threshold the elements contained     │
│ therein are not decoded during the first PI round.      │
└─────────────────────────────────────────────────────────┘
                            │
                            ▼
┌─────────────────────────────────────────────────────────┐
│ Synchronize the first and second datasets based on the  │
│ decoded elements.                                        │── 10c
└─────────────────────────────────────────────────────────┘
```

*Fig. 1*

DATASET RECONCILIATION THROUGH PARTITIONING AND POLYNOMIAL INTERPOLATION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104092.

FIELD OF THE INVENTION

The invention disclosed and claimed herein relates to the field of computer communications.

SUMMARY

Disclosed herein is a method for synchronizing first and second datasets respectively stored in first and second computers, an embodiment thereof comprises the following steps. The first step provides for partitioning each of the first and second datasets into a plurality of bins according to a first partitioning rule. Each bin contains a random subset of elements of symmetric difference (hereafter referred to as elements) taken from a universe of all possible elements that could be contained in the first and a second datasets. The next step provides for performing a first round of polynomial interpolation (PI) at a first encoding threshold on each bin of the first-partitioned datasets with the first and second computers. If any bin contains a number of elements that is less than or equal to the first encoding threshold the elements contained therein are decoded during the first PI round. If any bin contains a number of elements that is greater than the first encoding threshold the elements contained therein are not decoded during the first PI round. The next step provides for synchronizing the first and second datasets based on the decoded elements.

Another embodiment of the method for synchronizing first and second datasets respectively stored in first and second computers may be described as comprising the following steps. The first step provides for partitioning each of the first and second datasets $S_A$ and $S_B$ into $\ell = d/\log(d)$ bins according to a first partitioning rule, where the first and second datasets $S_A$ and $S_B$ are sets of binary data strings of length b. Each bin contains $n/\ell$ strings, where d is the absolute value of symmetric difference between the first and second datasets $S_A$ and $S_B$, and n is an index. Each bin contains a random subset of elements of the symmetric difference taken from a universe $\mathbb{F}_2^b$ of all possible elements that could be contained in the first and a second datasets $S_A$ and $S_B$. The next step provides for performing a first round of PI at a first encoding threshold M on each bin of the first-partitioned datasets with the first and second computers by computing $\ell$ characteristic functions, one for each bin, and evaluating each function at the threshold of M points. The next step provides for computing a hash consisting of H bits for each bin. The next step provides for partitioning each of the first and second datasets $S_A$ and $S_B$ into $\ell = d/\log(d)$ bins according to a second partitioning rule, where each bin contains $n/\ell$ strings. The next step provides for performing a second round of PI at a second encoding threshold fM on each bin of the second-partitioned datasets with the first and second computers by computing $\ell$ characteristic functions, one for each bin, and evaluating each function at the threshold of fM points, where $0 < f < 1$. The next step provides for computing a hash consisting of fH bits for each bin. The next step provides for iteratively repeating the above steps with different partitioning rules such that the encoding threshold and the length of the hashes are reduced by a factor of f with each iteration until the number encoding threshold is less than or equal to $\log(\log(d))$.

Another embodiment of the method for synchronizing first and second datasets may be described as comprising the following steps. The first step provides for performing first partitions of the first and second datasets by the first and second computers respectively such that each dataset is partitioned into a plurality of bins according to a first partitioning rule. Each bin contains a random subset of elements of symmetric difference. The next step provides for performing a first round of PI at a first encoding threshold on each bin of the first-partitioned datasets with the first and second computers. The next step provides for recording encodings from the first round of PI at the first and second computers. The next step provides for performing second partitions of the first and second datasets by the first and second computers respectively such that each dataset is partitioned into a plurality of bins according to a second partitioning rule. As with the first round of PI, each bin contains a random subset of elements. The next step provides for performing a second round of PI at a second encoding threshold on each bin of the second-partitioned datasets with the first and second computers. The next step provides for recording encodings from the second round of PI at the first and second computers. The next step provides for communicating the encodings from the first and second rounds of PI at the first and second computers in a single communication exchange between the first and second computers. For any given round of PI if any bin contains a number of elements that is less than or equal to the corresponding encoding threshold, the elements contained therein are decoded by the receiving computer. If any bin contains a number of elements that is greater than the corresponding encoding threshold the elements contained therein are not decoded by the receiving computer.

BRIEF DESCRIPTION OF THE DRAWINGS

Throughout the several views, like elements are referenced using like references. The elements in the figures are not drawn to scale and some dimensions are exaggerated for clarity.

FIG. 1 is a flowchart of an embodiment of a method for synchronizing first and second datasets.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

FIG. 1 is a flowchart of an embodiment of a method 10 for synchronizing first and second datasets that are respectively stored in first and second computers $12_a$ and $12_b$. Any computer that is capable storing and processing data may be used. For example, a computer configured to receive and process track data associated with maritime tactical command and control (MTC2) may be used to implement method 10. Another example operational scenario for method 10 is peer to peer file sharing such as transmitting music or movie files between computers. The dataset synchronization method 10 can be used to decrease the time needed to reconcile datasets between computers. Method 10 is especially useful in low-bandwidth or degraded-communications environments.

Figure 2:
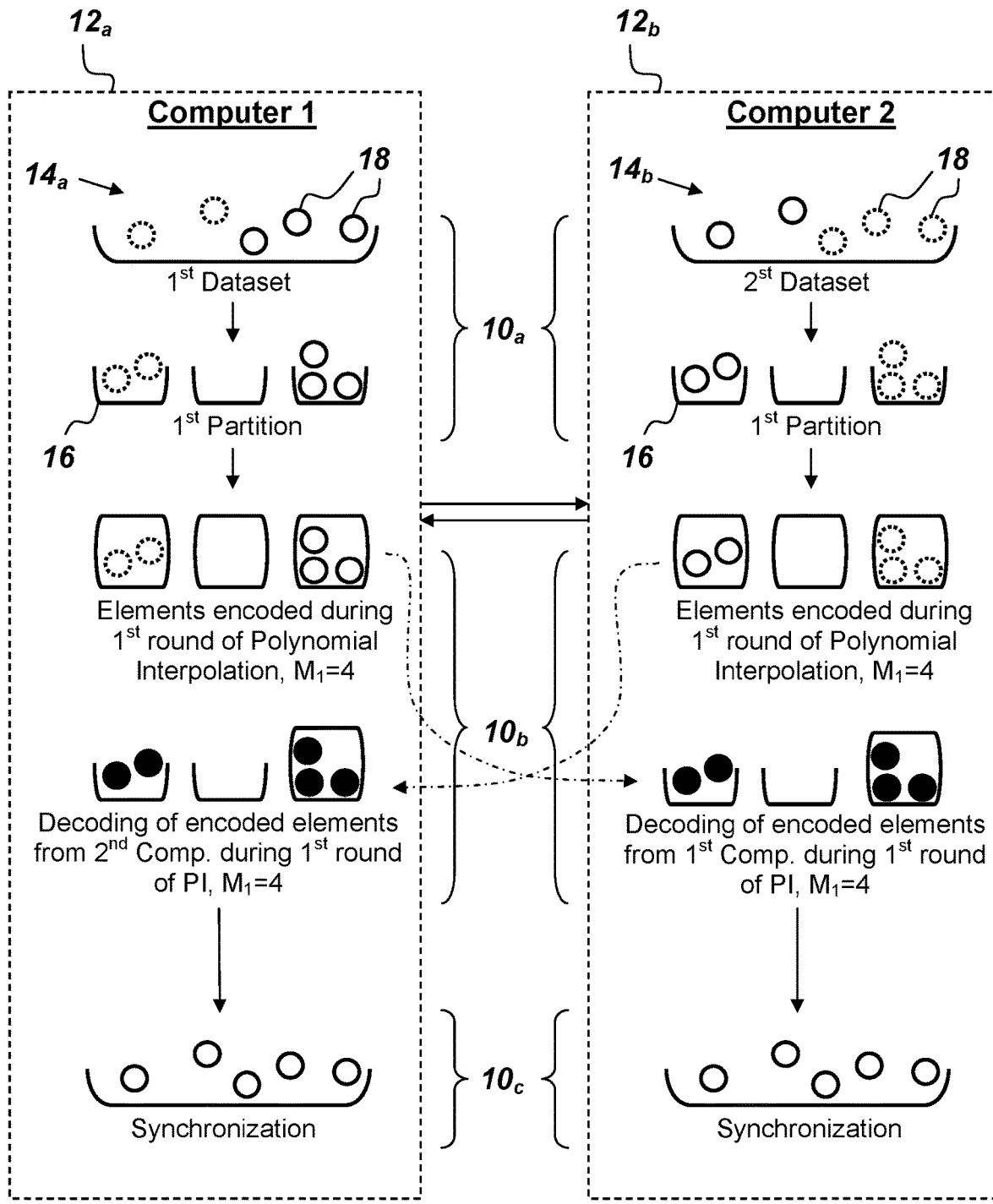
FIG. 2 is an illustration of an embodiment of a dataset synchronization method.

FIG. 2 is an illustration of the dataset synchronization method 10 embodiment, whose steps are outlined in FIG. 1. The embodiment of the dataset synchronization method 10 described and shown in FIGS. 1-2 comprises, consists of, or consists essentially of the following steps. The first step $10_a$ provides for partitioning each of the first and second datasets $14_a$ and $14_b$ into a plurality of bins 16 according to a first partitioning rule. Each bin 16 contains a random subset of elements 18 of symmetric difference (hereafter referred to as elements) taken from a universe of all possible elements 18 that could be contained in the first and a second datasets $14_a$ and $14_b$. In FIG. 2, the dashed circles represent elements 18 that the computer does not have in its own dataset. The next step $10_b$ provides for performing a first round of polynomial interpolation (PI) at a first encoding threshold $M_1$ on each bin 16 of the first-partitioned datasets $14_a$ and $14_b$ with the first and second computers $12_a$ and $12_b$. If any bin 16 contains a number of elements 18 that is less than or equal to the first encoding threshold $M_1$ the elements contained therein are decoded during the first PI round. For illustration purposes in FIG. 2, the first encoding threshold $M_1$ was set at 4, but it is to be understood that the encoding thresholds may be set to any desired value. If any bin 16 contains a number of elements 18 that is greater than the first encoding threshold $M_1$ the elements 18 contained therein are not decoded during the first PI round. Decoded elements 18 are represented in FIG. 2 by darkened circles. The next step $10_c$ provides for synchronizing the first and second datasets $14_a$ and $14_b$ based on the decoded elements 16.

Figure 3:
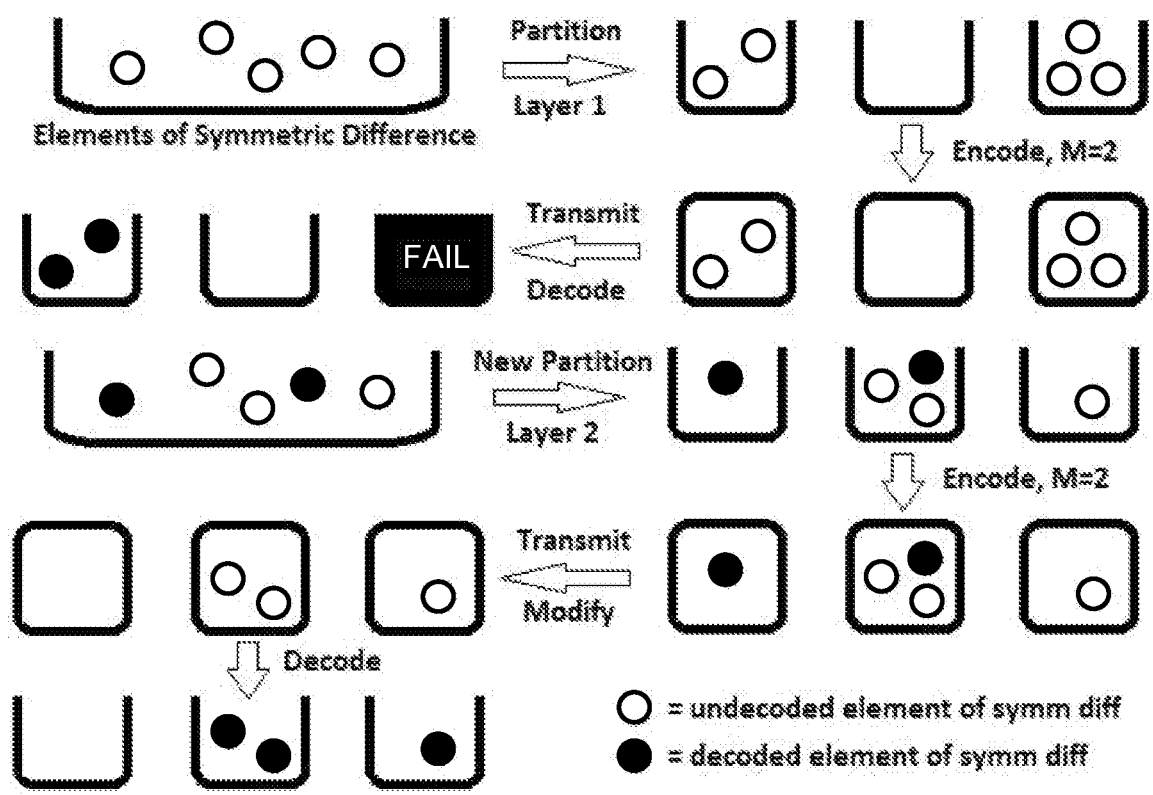
FIG. 3 is an illustration of an embodiment of a dataset synchronization method.

FIG. 3 is an illustration of another embodiment of the dataset synchronization method 10 that comprises two rounds of partitioning and PI. This embodiment shows a two-layer example of partitioning into three bins. In layer 1, one bin fails to decode since it has three elements, which exceeds the encode threshold M=2. In layer two, or rather during the second round, the first and a second datasets are partitioned into a plurality of bins according to a second partitioning rule. As with the first partitioning rule, in the second partition, each bin contains a random subset of elements taken from the universe of all possible elements that could be contained in the first and a second datasets $14_a$ and $14_b$. The second round of PI is performed at a second encoding threshold on each bin of the second-partitioned datasets $14_a$ and $14_b$ with the first and second computers $12_a$ and $12_b$. As with the first PI, in the second round of PI, if any bin contains a number of elements that is less than or equal to the second encoding threshold the elements contained therein are decoded during the second PI round, and if any bin contains a number of elements that is greater than the second encoding threshold the elements contained therein are not decoded during the second PI round. In this example embodiment, in layer 2, one bin would fail if not for a modification procedure which removed elements decoded in the earlier layer. In FIG. 3, the encoded elements are transmitted between computers during each round. However, the encoded elements from all rounds of partitioning may be exchanged between the first and second computers $12_a$ and $12_b$ in a single communication exchange. Such a transmission may be performed in a low-bandwidth/degraded communication environment.

Still referring to FIG. 3, an embodiment of the dataset synchronization method 10 may comprise the step of removing encoded elements that were decoded under a prior PI round from subsequent partition bins prior to the decoding performed during the subsequent PI round(s). The encoding thresholds M may be the same or different from each partitioning/PI round to the next. For example, the second encoding threshold may be less than the first encoding threshold. In many cases, the size of the symmetric difference is unknown before the first PI round and the first encoding threshold is selected based on a prediction of the size of the symmetric difference. One may continue to partition and perform rounds of PI until all elements have been decoded. The datasets may be highly structured data that form a common operation picture (COP), which is composed of discrete data elements known as tracks.

The dataset synchronization method 10 may be viewed as a variant of a set reconciliation problem. The set reconciliation problem has the following setup. Suppose two hosts, or computers, A and B, each have a set of binary strings of length b. Let $S_A$ denote the set of strings, or dataset, on Host A and let $S_B$ denote the set of strings, or dataset on Host B. The set reconciliation problem is to determine, using the minimum amount of information exchange, what to send from Host A to Host B with a single round of communication so that Host B can compute their symmetric difference $S_A \Delta S_B = (S_A \backslash S_B) \cup = (S_B \backslash S_A)$ where $d=|S_A \Delta S_B|$ and M is an estimate for an upper bound on d. Under a traditional setup, the estimate on d is accurate so that d≤M always holds, but d is not always known beforehand.

The dataset synchronization method 10 may be used in instances where the oracle (or the estimate for d) is inaccurate so that it may be that d>M. The following is a detailed description of an embodiment of the dataset synchronization method 10. In this embodiment, the idea is first to sub-divide the space $\{0,1\}^b$ containing the data strings into random subsets and run PI on each of these smaller sets. In executing PI, one encodes the data sets with a threshold parameter M. The value of M will be fixed at each round of PI. If M≥d then decoding will recover the entire symmetric difference. However, if M<d, then decoding may fail to recover anything (assuming that failure is detected) for a given bin. It is this value of M that determines the complexity of both the encode and decode processes of the PI algorithm. M's relationship to d determines whether PI succeeds or fails. Given an oracle that provides the value of d, one would set M=d and achieve the best possible complexity results. In the dataset synchronization method 10 the value of M may be estimated and many instances of PI may be strategically run, expecting only some them to succeed.

The following is an informal description of an embodiment of the encoding procedure that may be performed on the sets $S_A$ and $S_B$ that may be used during a PI round. In this embodiment, we partition the space $\mathbb{F}_2^b$ into $\ell = d/\log(d)$ bins each containing $n/\ell$ strings. Then, we perform PI on each bin, meaning we compute $\ell$ characteristic functions (one for each bin), and evaluate each function at the same threshold of M points. In addition, in this embodiment, we compute a hash consisting of H bits for each bin. Next, we similarly re-partition space into another set of $\ell$ bins each of size $n/\ell$. We again compute the characteristic function for each bin, except that now each characteristic function is evaluated at fM points and we compute a hash of fH bits for each bin, where 0<f<1. This process may be iterated each time with a new partitioning rule except the number of evaluation points and the length of the hashes may be reduced by a factor of f each iteration until the number of evaluation points is less than or equal to log(log(d)). One may then transmit the outcome of ALL the evaluations along with ALL the hashes to Host B, in a single transmission.

The informal description of the embodiment of the encoding procedure described above together with an example decoding procedure may be described formally as follows. The input to the procedure below is the set $S \subseteq \mathbb{F}_2^b$. Let $\chi_{S(z)} = \Pi_{x \in S}(z-x) \in \mathbb{F}_q[z]$ be a univariate polynomial with the indeterminate z, where there is an injective mapping of length-b bitstrings onto elements of the field $\mathbb{F}_q$ and $q \geq 2^b$, also known as the characteristic polynomial of the set S. Let $h_k$ be a hash which takes as input a subset of $\mathbb{F}_2^b$ and outputs [k] bits. Let K=[loglog(d)] and suppose we have the subsets $\mathcal{U}_{1,1}, \mathcal{U}_{1,2}, \ldots, \mathcal{U}_{1,\ell}, \mathcal{U}_{2,1}, \mathcal{U}_{2,2}, \ldots, \mathcal{U}_{2,\ell}, \ldots, \mathcal{U}_{K+1,1}, \mathcal{U}_{K+1,2}, \ldots, \mathcal{U}_{K+1,\ell}$ where for any $i \in [K+1]$, $\mathcal{U}_{i,1}, \mathcal{U}_{i,2}, \ldots, \mathcal{U}_{i,\ell}$ is a partition of the space $\mathbb{F}_2^b$. For shorthand, let $S(i,j)$ denote the elements of $S \subseteq \mathbb{F}_2^b$ that are in $\mathcal{U}_{i,j}$. Here we have that $S(i, j)$ refers to bin j at layer $i$. Let $c_1, c_2$ (discussed later) be such that $0 < c_1 < 1 < c_2$. For $i \in [K]$ let $E^i = \{e^i_{,1}, e^i_{,2}, \ldots, e^i_{,|E_i|}\} \subseteq \mathbb{F}_q$ such that $|E^i| = \lfloor (f)^{i-1} c_2 \log(d) \rfloor$, denote a set of evaluation points for characteristic polynomials with index $i$. Further ensure that the evaluation points in $E^i$ do not include any elements of $\mathbb{F}_q$ mapped to by length-b bitstrings. Similarly define $E_{K+1}$ such that $|E_{K+1}| = \lfloor \log(d) \rfloor$. Let $H = \lfloor c_3 \log d \rfloor b$ for some $c_3 > 0$.

An embodiment of the encoding procedure performed during a round of PI by both the first and second computers $12_a$ and $12_b$, or Host A and Host B, is represented below by Algorithm 1.

Algorithm 1 Encode

Input: $S \subseteq \mathbb{F}_2^b$, $E_i$, H
1: for $i \in [K]$ and $j \in [l]$ do
2:     Compute $\chi_{S(i,j)}(z)$, $h^{i,j} = h_{[O]^{i-1}H}(S(i,j))$.
3:     Evaluate $\{\chi_{S(i,j)}(e) | e \in E_i\} = \chi^{i,j}$.
4: end for
5: for $j \in [l]$ do
6:     Compute $\chi_{S(K+1,j)}(z)$.
7:     Evaluate $\{\chi_{S(K+1,j)}(e) | e \in E_{K+1}\} = \chi^{K+1,j}$.
8: end for
Output: $\chi^{i,j}$, $h^{i,j}$, $\chi^{K+1,j}$ for $i \in [K]$ and $j \in [l]$ Let $\chi_A^{i,j}$, $h_A^{i,j}$, $\chi_A^{K+1,j}$ be the result of performing the encoding procedure (i.e., Algorithm 1) on Host A and similarly let $\chi_B^{i,j}$, $h_B^{i,j}$, $\chi_B^{K+1,j}$ be the result of performing the encoding procedure (i.e., Algorithm 1) on Host B. First, Host A sends to Host B $\chi_A^{i,j}$, $h_A^{i,j}$, $\chi_A^{K+1,j}$ for $i \in [K]$ and $j \in [\ell]$. Since $\chi^{i,j}$ requires $f^{i-1} c_2 \log(d) \cdot b$ bits of storage, $h^{i,j}$ requires $f^{i-1} c_3 \log(d) \cdot b$ bits of storage, and PI requires db bits of information exchange, notice that this requires at most $$\Sigma_{i=0}^K (f)^i \cdot (c_2 \log(d) + c_3 \log(d)) b \cdot \frac{d}{\log(d)} + \log(d) \cdot \frac{d}{\log(d)} \cdot b \leq \frac{1}{1-f} \cdot (c_2 + c_3) db + db = O(db)$$

bits of information exchange. As PI has encode complexity O(d), similar reasoning gives our encode complexity of O(d).

The ability to modify an already encoded $\chi_S^{i,j}$ to add or remove elements is possible in linear time and it is shown below as Algorithm 2. $D_1$ will designate the sets of elements we want to add. $D_2$ will designate the sets of elements we want to remove.

Algorithm 2 Modify

Input: $D_1, D_2 \subseteq S(i, j)$ such that $D_1 \cap D_2 = \phi$, $X_S^{i,j}$, $E_i$ 1:     Compute $\frac{X_{D_1}(z)}{X_{D_2}(z)} = X^*_{D_1,D_2}(z)$ 2:     Evaluate: $\{X_{S(i,j)}(e) \cdot X_{D_1,D_2}^*(e) | e \in E_i\} = X_{S \Delta D}^{i,j}$
Output: $X_{S \Delta D}^{i,j}$ Let $PID(\chi_{S_1}, \chi_{S_2}, E)$, $E \subseteq \mathbb{F}_q$ denote the standard PI decode algorithm, where E is the evaluation set and |E|=M. Recall that the standard PI decode algorithm outputs $S_1 \Delta S_2$ if $|S_1 \Delta S_2| \leq M$ the threshold at which the two $\chi$'s were originally encoded. Using the modification process described herein, and shown in Algorithm 2 above, we can decrease the symmetric difference between the encoded sets and thus improve the likelihood for PID to successfully decode given knowledge of some of the elements in the symmetric difference. We now present in Algorithm 3 the decode algorithm which may be performed on Host B, which calls the modify algorithm 2.

Algorithm 3 Decode

Input: $\chi_A^{i,j}$, $h_A^{i,j}$, $\chi_A^{K+1,j}$, $\chi_B^{i,j}$, $\chi_B^{K+1,j}$, $S_B$, $|E_1|$
1: Initialize $\mathcal{D} = \emptyset$
2: for $i \leftarrow 1$ to $K + 1$ do
3:     Compute $D_1 = \mathcal{D} \cap S_B$, $D_2 = \mathcal{D} \setminus S_B$
4:     for $j \leftarrow 1$ to $l$ do
5:         Compute $\chi_{A \Delta D}^{i,j}$ = Modify($D_1(i,j)$, $D_2(i,j)$, $\chi_A^{i,j}$, $E_1$)
6:         Compute $D' = PID(\chi_{A \Delta D}^{i,j}, \chi_B^{i,j}, E_1)$
7:         if $i = K + 1$ or $h_H^{s-1}(S_H(i,j) \Delta (\mathcal{D} \cup \mathcal{D}')) = h_A^{i,j}$ then
8:             Update $\mathcal{D} = \mathcal{D} \cup \mathcal{D}'$.
9:         end if
10:    end for
11: end for
Output: $\mathcal{D}$ Recall that PI has decode complexity $O(M^3)$. Thus our algorithm has decode complexity $$O(d \cdot \log(d)^2): \Sigma_{i=0}^K f^i \cdot ([c_2 \log(d)]^3 + c_3 \log(d)) \cdot \frac{d}{\log(d)} + \log(d)^3 \cdot \frac{d}{\log(d)} = O(d \cdot \log(d)^2).$$

Next, we discuss the intuition behind this approach. Since we partitioned the universe (of size $n = 2^b$) into $\ell$ random bins, if there are d elements in the symmetric difference, then each bin is expected to contain $$d \cdot \frac{\log(d)}{d} = \log(d)$$

elements from the symmetric difference as it follows a binomial distribution B(N, p) where $$N = \frac{n \cdot \log(d)}{d} \text{ and } p = \frac{d}{n}.$$

The variance is $$\frac{n \cdot \log(d)}{d} \cdot \frac{d}{n} \cdot \left(1 - \frac{d}{n}\right) < \log(d),$$

and thus $\sigma < \sqrt{\log(d)}$. Thus for any fixed $0 < c_1 < 1 < c_2$, for large enough d at least half of the total bins will contain between $c_1M$ and $c_2M$ elements from the set difference. Using PI, we can recover at least $(1/2 l)(c_4 M) > 0$ elements for some $c_4 > 0$, or a fixed positive fraction of the total symmetric difference. Iterating, we can recover at least that same fraction of the remaining symmetric difference each layer until almost all the elements in the symmetric difference have been recovered. Under certain conditions, the K+1 layer then has sufficiently high threshold to recover the remaining elements. Notice that under this setup, it is possible to recover a portion of the symmetric difference even though some bins may fail.

The following theorem shows that for large d (and correspondingly large $n = 2^b$, as trivially $n \geq 2d$) that the probability of the processes of the dataset synchronization method 10 successfully recovering the symmetric difference tends to 1. The proof is a straightforward application of Chernoff bounds. While our earlier treatment dealt with general parameters, for the below theorem we chose the following fixed values to simplify our proof: $c_1 = 1/3$, $c_2 = 7/4$, $c_3 = 1/4$, and $f = 1/6$.

THEOREM 1

Suppose $n = 2^b \geq 2d$ and $d \geq 1024$. Let $S_A, S_B \subseteq \mathbb{F}_2^b$ where for any $x \in \mathbb{F}_2^b$, $$Pr(x \in S_A \Delta S_B) = \frac{d}{n}.$$

Then the probability the algorithm fails to recover the symmetric difference, denoted Pr(F), is at most $$Pr(F) \leq \log \log d \cdot \left(2 \cdot (0.999)^{\left(\frac{3}{4}\right)^{\log d} \cdot \frac{d}{\log d}} + 2^{-\frac{b}{4} \cdot \log(d)^{\frac{2}{3}}}\right),$$

so that $Pr(F) \to 0$, as $d \to \infty$. The above discussion forms the theoretical basis for the dataset synchronization method 10, but a number of parameters is up to the user to pick in implementation. The following discussion motivates our selection of these parameters and defines an example implementation.

An example embodiment of the dataset synchronization method 10 has multiple layers (i.e., multiple rounds of partitioning, modifying, and PI). In a given layer of this embodiment, we want M to be small and l to be large, since each call of PID has complexity $O(M^3)$. In choosing l to be roughly $d/\log(d)$, we expect roughly $\log(d)$ elements of the symmetric difference per bin at the first layer. While the distribution of this elements and bins problem means that some bins will have more elements than $\log(d)$, by setting M at slightly above that value, we expect a reasonable number of bins to successfully decode. Moreover, we expect a reasonable number of elements of the symmetric difference to be in successfully decoded bins. If we adjust M appropriately from layer to layer, we can maintain a set fractional decoding in every layer—such as half.

Initial values of M, l, K may be determined by a Heuristic, as may be the reduced value of M at each layer. Pseudocode for such an implementation and both Heuristics are provided below in Algorithms 4, 5, and 6 respectively.

| Algorithm 4 Simulation Implementation |
|---|
| Input: $S_A$, $S_B$, d |
| 1: $M_1$, l, K ← Heuristic$_1$ (d) |
| 2: for i ← 1 to K do |
| 3:   for all $x \in \mathbb{F}_2^b$ do |
| 4:     Assign x to $u_{i,j}$ uniformly random. $j \in [1, l]$ |
| 5:   end for |
| 6:   Pick $E_i$ such that $|E_i| = M_i$ |
| 7:   $M_{i+1}$ ← Heuristic$_2(M_i)$ |
| 8: end for |
| 9: $E_{K+1}$ ← ∅ |
| 10: $\chi_A^{i,j}$, $h_A^{i,j}$, $\chi_A^{K+1,j}$ ← Encode($S_A$, $E_i$, H) |
| 11: $\chi_B^{i,j}$, $h_B^{i,j}$, $\chi_B^{K+1,j}$ ← Encode($S_B$, $E_i$, H) |
| 12: $\mathcal{D}$ ← Decode($\chi_A^{i,j}$, $h_A^{i,j}$, ∅, $\chi_B^{i,j}$, ∅, $S_{B, |E_i|}$) |
| Output $\mathcal{D}$ |

| Algorithm 5 Heuristic$_1$ |
|---|
| Input: d |
| 1:   if d <= 3 then |
| 2:     d ← 3 + 1 |
| 3:   end if |
| 4:   M ← $\lceil \log_3(d) \rceil$ |
| 5:   $l \leftarrow \left\lceil \frac{d}{\log_3(d)} \right\rceil$ |
| 6:   K ← $\lceil \log_2(M) \rceil$ |
| 7:   if K = 1 then |
| 8:     M ← M + 1 |
| 9:   end if |
| Output: M, l, K |

| Algorithm 6 Heuristic$_2$ |
|---|
| Input: M |
| 1: M ← $\lceil M/2 \rceil$ + 1 |
| Output: M |

Our goal with this example embodiment was to decode at least half of the elements in each layer—and our simulation results show we met (and usually far exceeded) that goal in almost every run. Thus, we decreased the value of M by roughly half each layer until it hit 1 which means K~log log d. If we had infinite layers, we would expect all of the elements to decode in the limit; but in practice K will be very small, ≤3 in all cases we initially considered.

Thus we developed the two Heuristics (i.e., algorithms 5 and 6) in this embodiment to compensate for the small number of layers. Heuristic$_1$ targets especially small values of d which would only have a single layer. Heuristic$_2$ considers cases where there are multiple layers. In both cases we slightly boost M in order to provide faster convergence, since K is small. In simulation, the algorithm was already fairly successful at decoding, so we chose to skip the K+1 layer. In Algorithm 4 we denote this by letting $|E_{K+1}|=0$ so the encoding in layer K+1 would be empty and we explicitly enter ∅ into the K+1'th layer's inputs for Decode.

FIRST SIMULATION

To test an embodiment of the dataset synchronization method 10, we generated synthetic data and used method 10 to attempt to find the symmetric difference while recording certain metrics to gauge performance. We tracked the fraction of the symmetric difference that successfully decoded at the end of each layer, as well as cost of space to transmit and decode computation. For this simulation, the universe Ω of possible set elements was of the size $|\Omega|=10000$. The set $S_A$ was of size $|S_A|=3000$, and was chosen uniformly at random from Ω. The size of the symmetric difference between $S_A$ and $S_B$, d is the parameter we varied, from 1 . . . 1000. $S_B$ was constructed by modifying $S_A$ to achieve d. For each value of d, we ran the simulation R=10000 times. Thus in total we ran $10^7$ different simulations.

PI succeeds if the size of the symmetric difference does not exceed the threshold picked at encoding. Success means the entire symmetric difference is recovered. Failure means potentially nothing is recovered. Recall decoding has $O(M^3)$ complexity; to save processing time, we implemented a blackbox that has total success/failure based on the relationship between the symmetric difference and the threshold. The nuance is that when PI fails it is desirable to detect the failure. It is desirable to keep M as small as possible.

In this embodiment, we utilize an independent hash function of size H. This changes the space required to M*b+H, and probability of not detecting failure to $2^{-H}$. For simulation, we used H=10 and didn't reduce it between layers. We used this value to calculate the space required by the dataset synchronization method 10, but we still assumed our blackbox had a perfect ability to detect failure. We feel that this is reasonable for two reasons. First, the value of M is small, so even if a failure goes undetected it can at most add M "incorrect" elements to our symmetric difference—thus the impact is relatively insignificant. Second, the actual number of calls of PID is fairly small—we can reasonably expect very few undetected failures or none at all. For example, for d=50 PID is called 30 times and for d=1000 it is 480 times.

SECOND SIMULATION

We ran a second simulation where instead of dynamically calculating the space required based on the size of the symmetric difference, we instead calculated the space required if d=50 and fixed that amount throughout the simulation. In the interest of time, we ran this simulation with smaller values for generating our synthetic data. In particular $|\Omega|=1000$, $|S_A|=|S_B|=300$, R=1000 and we ran the simulation across d=40 . . . 130. The purpose of this simulation was to investigate how resilient the example embodiment of the dataset synchronization method 10 was when the estimate for the symmetric difference was incorrect.

Figure 4A:
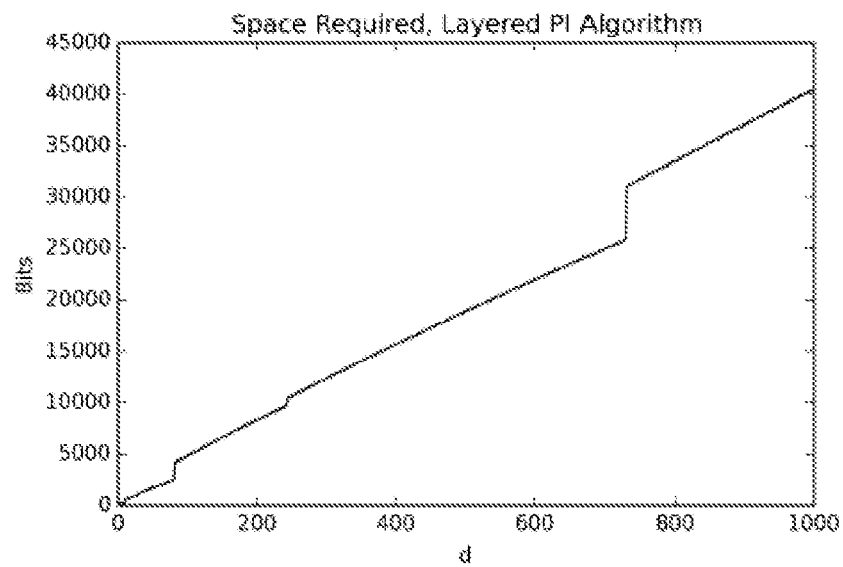
FIGS. 4A-4B are graphs of performance characteristics of an embodiment of a dataset synchronization method.
Figure 4B:
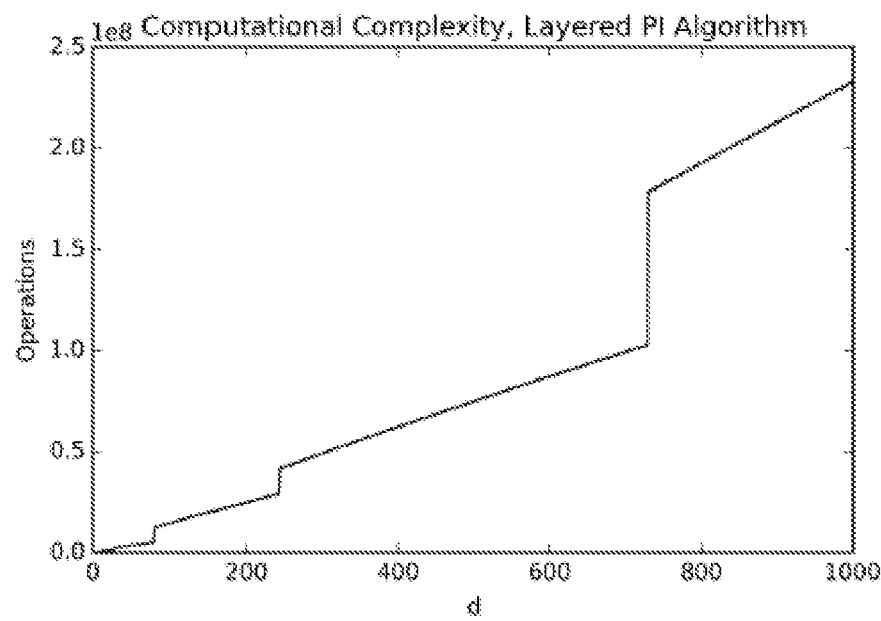
Figure 5A:
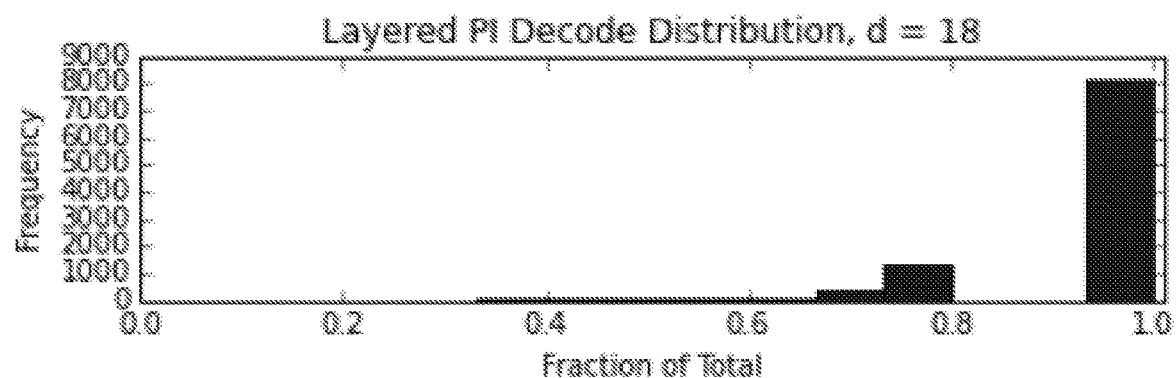
FIGS. 5A-5B are graphs of performance characteristics of an embodiment of a dataset synchronization method.
Figure 5B:
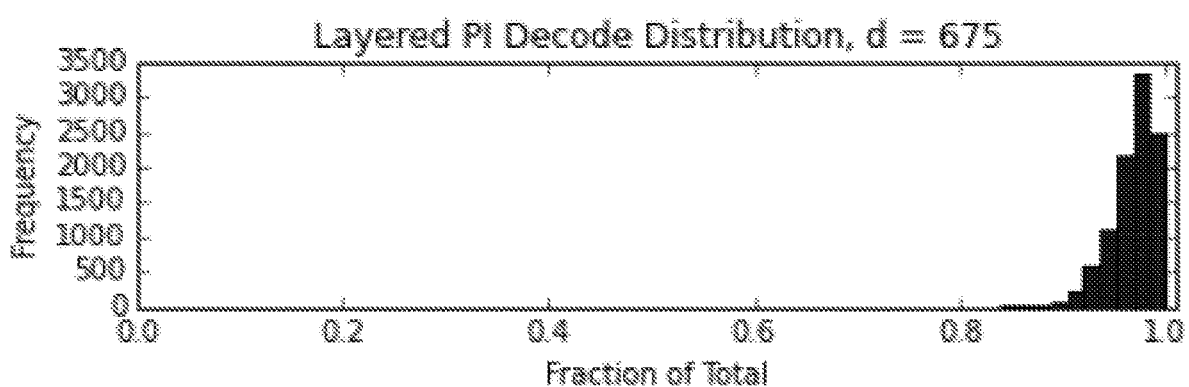

FIG. 4A is a graph of the space requirements of an embodiment of the dataset synchronization method 10. FIG. 4A shows that the space requirement of Method 10 increases roughly linearly, with occasional small jumps due to the ceiling functions in our calculations. FIG. 4B is a graph of the computational complexity of an embodiment of the dataset synchronization method 10. FIG. 4B shows the compute time for decode increases faster than linearly, but notably is less than cubic. FIGS. 5A and 5B are graphs that show the distribution of results for two example values of d, 18 and 675 respectively. More specifically FIGS. 5A and 5B show the fraction of the symmetric difference that was successfully recovered at the end of a run, tallying over 10,000 runs. These values of d were chosen as they showcased examples where Algorithm 4 had relatively more runs fail to fully decode and thus resulted in more interesting distributions.

The dataset synchronization method 10 has several desirable characteristics, particularly from the perspective of Disconnected Intermittent Limited (DIL) environments. Given the same space, method 10 fully decodes the symmetric difference on average better prior art approaches. However, we feel the more compelling story comes from examining what happens when the symmetric difference is not fully decoded. In that case, an embodiment of method 10 successfully decodes a very high fraction of the symmetric difference. Method 10's performance is usually in the high 90%'s. In scenarios with just a single round of communication, if the decode is not fully successful, method 10 still manages to recover most of that symmetric difference. This has significant implications if a subsequent round of communication is not possible, and even if it is, it significantly lightens the load for that next round.

In practice, one does not know the exact size of the symmetric difference a priori and must use another technique to estimate its value. PI is extremely sensitive to that estimate—if the threshold is set even 1 too small it may fail to recover any elements of the set difference, and if the threshold is even 1 too small it loses ideal complexity characteristics. The dataset synchronization method 10 offers improvements to the set reconciliation problem encountered by prior art approaches. The price method 10 pays for these advantages comes from space required and decode complexity. Recall that method 10 requires O(db). Method 10 has an encode complexity of O(d) and a decode complexity $O(d \cdot \log(d)^2)$. Decoding for method 10 can be performed in parallel across $$\ell = \frac{d}{\log d} \text{ nodes,}$$

and re-aggregating the results gives an effective decode complexity of O(d) after parallelization thus reducing the gap between prior art approaches and the dataset synchronization method 10.

From the above description of the dataset synchronization method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for synchronizing first and second datasets respectively stored in first and second computers, the method comprising the following steps:

partitioning each of the first and second datasets into a plurality of bins according to a first partitioning rule, wherein each bin contains a random subset of elements of symmetric difference (hereafter referred to as elements) taken from a universe of all possible elements that could be contained in the first and a second datasets;

performing a first round of polynomial interpolation (PI) at a first encoding threshold on each bin of the first-partitioned datasets with the first and second computers, wherein if any bin contains a number of elements that is less than or equal to the first encoding threshold the elements contained therein are decoded during the first PI round, and wherein if any bin contains a number of elements that is greater than the first encoding threshold the elements contained therein are not decoded during the first PI round; and synchronizing the first and second datasets based on the decoded elements.

2. The method of claim 1, further comprising the following steps which are performed prior to the synchronizing step:

partitioning the first and a second datasets into a plurality of bins according to a second partitioning rule, wherein each bin contains a random subset of elements taken from the universe of all possible elements that could be contained in the first and a second datasets; and performing a second round of PI at a second encoding threshold on each bin of the second-partitioned datasets with the first and second computers, wherein if any bin contains a number of elements that is less than or equal to the second encoding threshold the elements contained therein are decoded during the second PI round, and wherein if any bin contains a number of elements that is greater than the second encoding threshold the elements contained therein are not decoded during the second PI round.

3. The method of claim 2, further comprising the step of removing encoded elements that were decoded under the first PI round from the second partition bins prior to the decoding performed during the second PI round.

4. The method of claim 3, wherein the second encoding threshold is less than the first encoding threshold.

5. The method of claim 4, further comprising the step of transmitting in the same transmission between the first and second computers the encoded bins from the first and second PI rounds such that the dataset synchronization is performed in a single communication exchange between the first and second computers.

6. The method of claim 5, wherein the transmission is performed in a low-bandwidth environment.

7. The method of claim 5, wherein the size of the symmetric difference is unknown before the first PI round.

8. The method of claim 1, wherein each bin contains a random subset of elements according to a binomial distribution.

9. The method of claim 4, further comprising the following step which is performed prior to the synchronizing step:

continuing to partition and perform rounds of PI until all elements have been decoded.

10. The method of claim 5, wherein the datasets are highly structured data that form a common operation picture, which is composed of discrete data elements known as tracks such that after the single communication exchange the tracks are synchronized.

11. A method for synchronizing first and second datasets $S_A$ and $S_B$ respectively stored in first and second computers, wherein the first and second datasets $S_A$ and $S_B$ are sets of binary data strings of length b, the method comprising the following steps:

partitioning each of the first and second datasets $S_A$ and $S_B$ into $\ell$ =d/log(d) bins according to a first partitioning rule, wherein each bin contains n/$\ell$ strings, where d is the absolute value of symmetric difference between the first and second datasets $S_A$ and $S_B$, and n is an index, and wherein each bin contains a random subset of elements of the symmetric difference (hereafter referred to as elements) taken from a universe $\mathbb{F}_2^b$ of all possible elements that could be contained in the first and a second datasets $S_A$ and $S_B$;

performing a first round of polynomial interpolation (PI) at a first encoding threshold M on each bin of the first-partitioned datasets with the first and second computers by computing $\ell$ characteristic functions, one for each bin, and evaluating each function at the threshold of M points;

computing a hash consisting of H bits for each bin;

partitioning each of the first and second datasets $S_A$ and $S_B$ into $\ell$ =d/log(d) bins according to a second partitioning rule, wherein each bin contains n/$\ell$ strings;

performing a second round of PI at a second encoding threshold fM on each bin of the second-partitioned datasets with the first and second computers by computing $\ell$ characteristic functions, one for each bin, and evaluating each function at the threshold of fM points, where 0<f<1;

computing a hash consisting of fH bits for each bin; and iteratively repeating the above steps with different partitioning rules such that the encoding threshold and the length of the hashes are reduced by a factor of f with each iteration until the number encoding threshold is less than or equal to log(log(d)).

12. The method of claim 11, further comprising the step of transmitting results from all rounds of PI and all hashes performed by the first computer in a single transmission to the second computer and vice-versa.

13. The method of claim 12, wherein the transmissions are performed in a low-bandwidth environment.

14. The method of claim 12, wherein d is unknown before the first PI round.

15. The method of claim 14, wherein the datasets are highly structured data that form a common operation picture, which is composed of discrete data elements known as tracks such that after the single transmission from each of the first and second computers the tracks are synchronized.

16. A method for synchronizing first and second datasets respectively stored in first and second computers, the method comprising the following steps:

performing first partitions of the first and second datasets by the first and second computers respectively such that each dataset is partitioned into a plurality of bins according to a first partitioning rule, wherein each bin contains a random subset of elements of symmetric difference (hereafter referred to as elements);

performing a first round of polynomial interpolation (PI) at a first encoding threshold on each bin of the first-partitioned datasets with the first and second computers;

recording encodings from the first round of PI at the first and second computers;

performing second partitions of the first and second datasets by the first and second computers respectively such that each dataset is partitioned into a plurality of bins according to a second partitioning rule, wherein each bin contains a random subset of elements;

performing a second round of PI at a second encoding threshold on each bin of the second-partitioned datasets with the first and second computers;

recording encodings from the second round of PI at the first and second computers; and communicating the encodings from the first and second rounds of PI at the first and second computers in a single communication exchange between the first and second computers, wherein for any given round of PI if any bin contains a number of elements that is less than or equal to the corresponding encoding threshold, the elements contained therein are decoded by the receiving computer, and wherein if any bin contains a number of elements that is greater than the corresponding encoding threshold the elements contained therein are not decoded by the receiving computer.

17. The method of claim 16, wherein the communication exchange is performed in a low-bandwidth environment.

18. The method of claim 16, wherein the size of the symmetric difference is unknown before the first PI round.

19. The method of claim 16, wherein the datasets are highly structured data that form a common operation picture, which is composed of discrete data elements known as tracks such that after the step of communicating the results the tracks are synchronized.

20. The method of claim 16, further comprising the step of removing encoded elements that were decoded under the first PI round from the second partition bins prior to the decoding performed during the second PI round thereby decreasing the number of elements in the second partition bins.

* * * * *